(12) United States Patent  
Walter et al.

(10) Patent No.: US 9,489,216 B2
(45) Date of Patent: Nov. 8, 2016

(54) ACTIVE TILED USER INTERFACE

(75) Inventors: Wolfgang E. Walter, Schoferstr. (DE); Christoph Persich, Wasserturmallee (DE)

(73) Assignee: SAP SE, Walldorf (DE)

( * ) Notice: Subject to any disclaimer, the term of this patent is extended or adjusted under 35 U.S.C. 154(b) by 2680 days.

(21) Appl. No.: 11/829,025

(22) Filed: Jul. 26, 2007

(65) Prior Publication Data
US 2009/0031247 A1    Jan. 29, 2009

(51) Int. Cl.
*G06F 3/048* (2013.01)
*G06F 9/44* (2006.01)

(52) U.S. Cl.
CPC .................................. *G06F 9/4443* (2013.01)

(58) Field of Classification Search
CPC ....................................................... G06F 9/4443
USPC .......................... 715/798, 788, 792, 765, 860
See application file for complete search history.

(56) References Cited

U.S. PATENT DOCUMENTS

| | | | | |
|---|---|---|---|---|
| 5,060,170 A * | 10/1991 | Bourgeois et al. | ........... | 715/788 |
| 5,371,847 A * | 12/1994 | Hargrove | ..................... | 715/788 |
| 5,390,295 A * | 2/1995 | Bates et al. | .................... | 715/789 |
| 5,712,995 A * | 1/1998 | Cohn | ................... | G06F 3/0481 715/792 |
| 5,771,042 A * | 6/1998 | Santos-Gomez | ............. | 715/800 |
| 6,216,141 B1 * | 4/2001 | Straub et al. | ................ | 715/234 |
| 6,310,631 B1 * | 10/2001 | Cecco et al. | .................. | 715/792 |
| 6,421,694 B1 * | 7/2002 | Nawaz et al. | ................ | 715/234 |
| 7,028,264 B2 * | 4/2006 | Santoro et al. | ............... | 715/765 |
| 7,703,022 B2 * | 4/2010 | Arthurs et al. | ............... | 715/742 |
| 2007/0016875 A1 * | 1/2007 | Santos-Gomez | ............. | 715/798 |

* cited by examiner

*Primary Examiner* — Andrey Belousov
(74) *Attorney, Agent, or Firm* — Brake Hughes Bellermann LLP

(57) ABSTRACT

A computer interface can be customized by a user at run time (instead of by a developer or administrator at an earlier time). A rectangular area can be divided into a plurality of sub-areas, and content sources assigned to each sub-area; or two adjacent sub-areas can be coalesced into a single, larger area. Content sources are assigned to each sub-area, and live content from the assigned source is displayed in the sub-area.

20 Claims, 9 Drawing Sheets

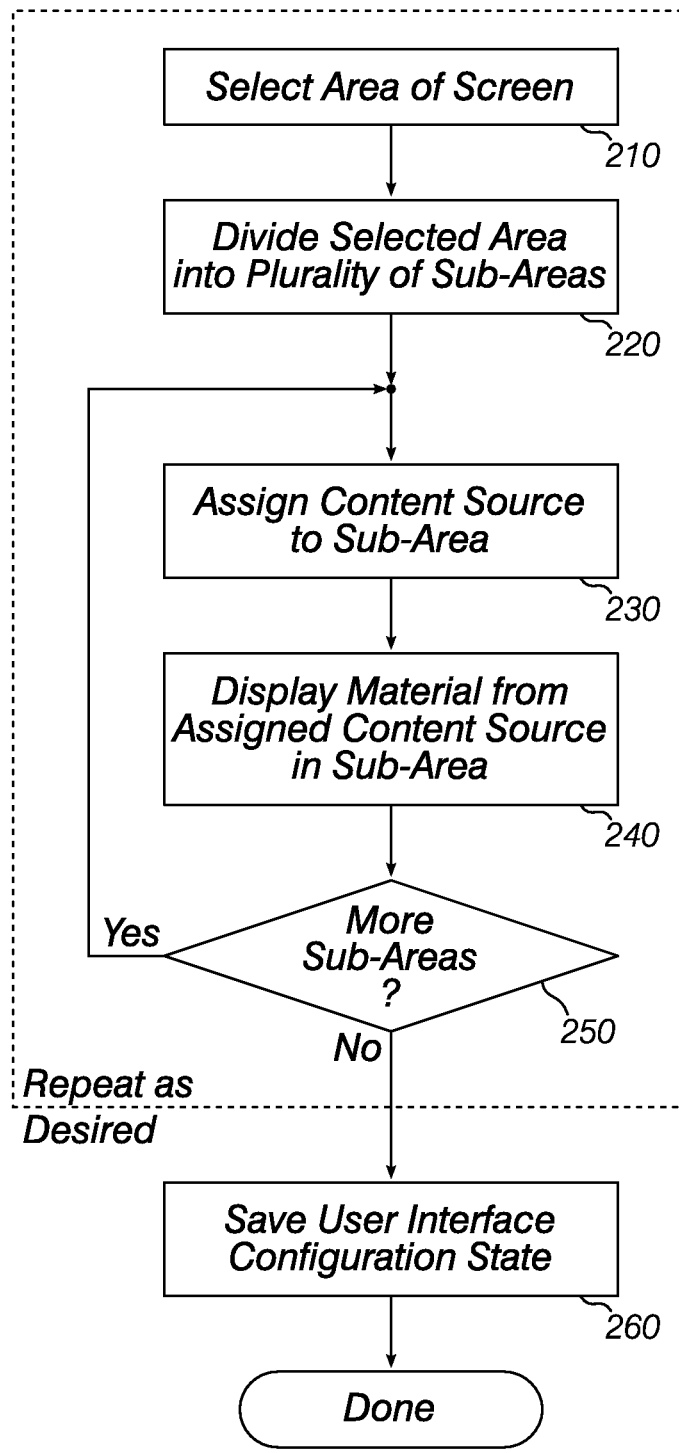

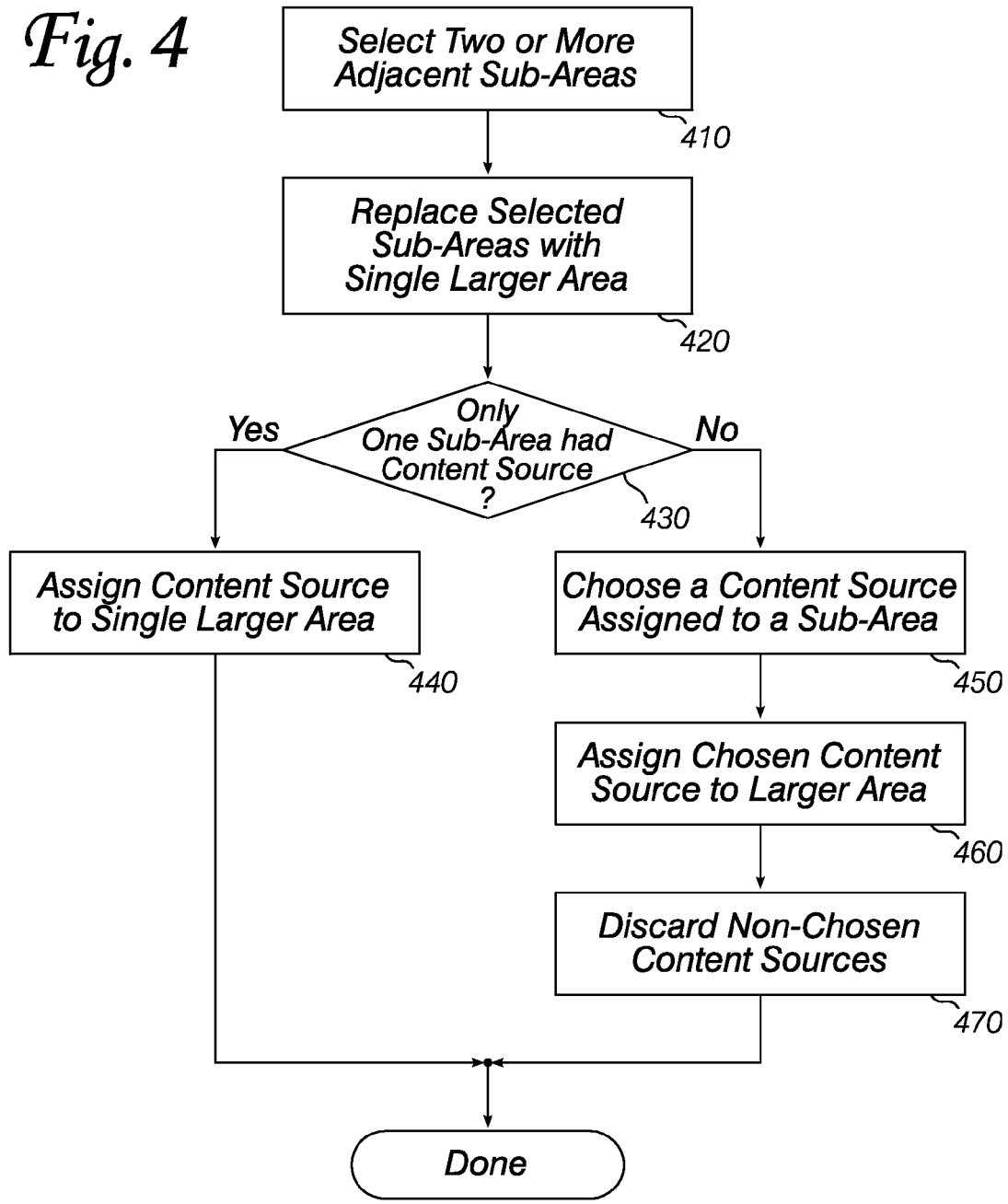

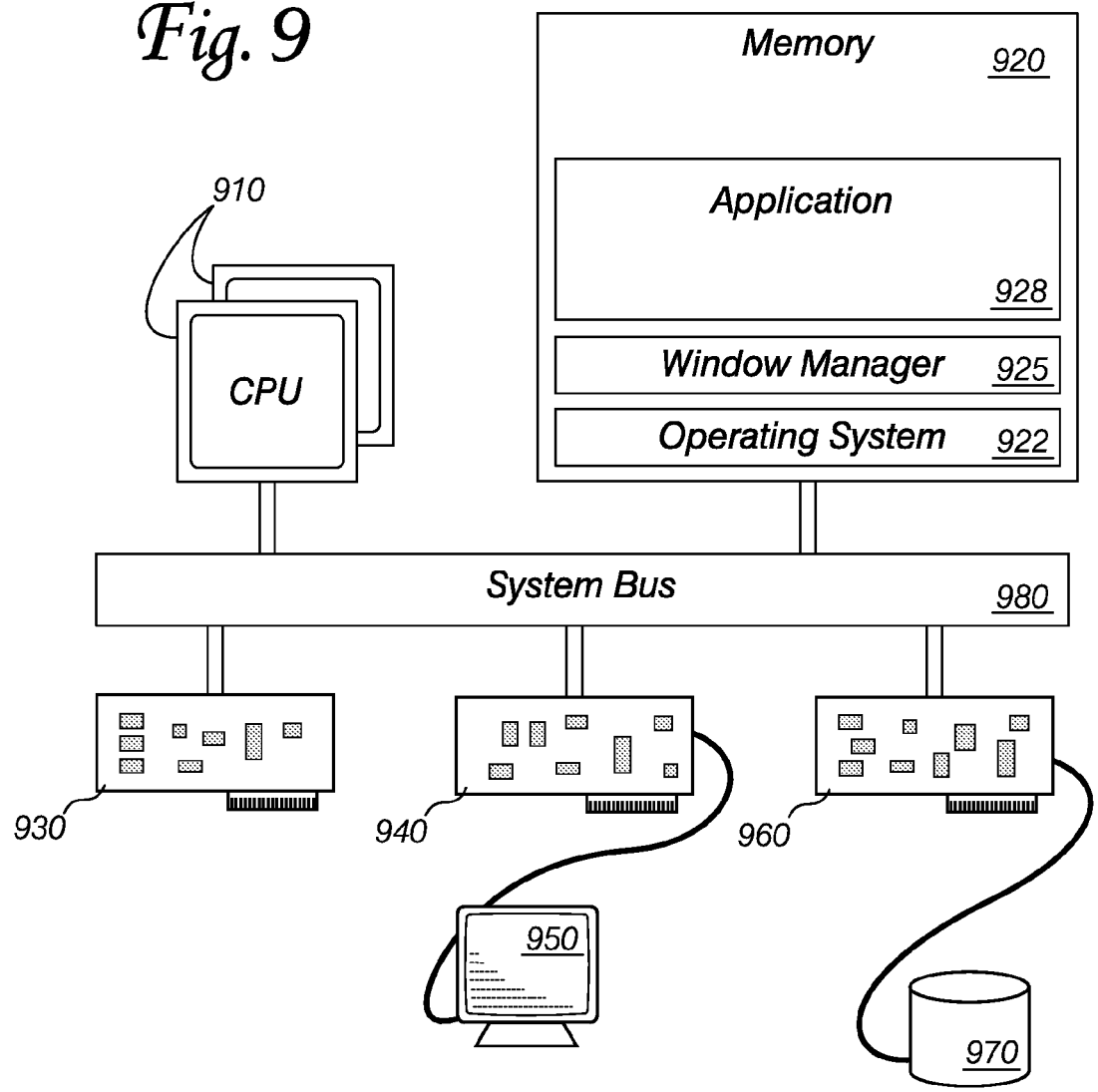

ACTIVE TILED USER INTERFACE

FIELD

Embodiments of the invention relate to computer user interfaces. More specifically, embodiments of the invention relate to methods for a user to customize a user interface at run-time, where the effects of an interface change are substantially immediately visible.

BACKGROUND

Computer interfaces have advanced far beyond the "glass terminal" model, where early cathode-ray tube ("CRT") monitors were pressed into service to display lines of fixed-width, monochrome text characters, as if the CRTs were nothing more than paperless teletypes. Contemporary computers often use a variant of the stacking window system developed at the Xerox Palo Alto Research Center ("PARC") in the late 1970s and early 1980s. Some attempts have been made to implement three-dimensional "virtual reality" user interfaces, but 2½ dimensional stacking windows (two-dimensional windows that behave as if they can be overlapped or "stacked" on top of each other in a simulated third dimension) are currently in widest use.

Overlapping windows facilitate effective use of limited-size screens and provide an intuitive way for users to interact with several different applications that may be used simultaneously. Each program may display a number of separate windows (e.g., documents, dialog windows and toolbars) that the user can position at convenient locations on the screen. A program known as a "window manager" coordinates various applications' windows, tracking the resizing and simulated stacking order of the windows and arranging for portions of windows that are not occluded by overlying windows to be drawn appropriately. Sometimes an application's windows can be moved together (i.e., if one of a program's windows is moved, all of the other windows move as well), and sometimes each window can be moved individually. Furthermore, some programs permit sub-components such as buttons or menus to be added to or removed from the program's windows.

Windows that can be freely moved, resized and ordered top-to-bottom offer excellent configurability for users who rely on their computers to perform a range of tasks. However, the same flexibility can be detrimental for a user who requires a configurable control- and information-rich interface, but who does not need window-by-window and moment-by-moment adjustment capability. Such a user may prefer to undertake the task of placing and sizing windows only infrequently, relying on the system to re-create his preferred interface automatically when he begins working.

A user interface management system that suits a user who has complex, but only occasionally-changing, interface needs may be of value in many environments.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 2 outlines a method for adding content sources to a user interface.

FIG. 4 outlines a method for removing content sources from a user interface.

FIG. 9 shows a computer system that implements an embodiment of the invention.

DETAILED DESCRIPTION

Embodiments of the invention facilitate the creation of a customized user interface. A user has great flexibility in setting up an interface, which can thereafter be displayed without additional configuration effort. During setup (and later, if changes are made while the interface is in use) the user's live data is presented in the interface, so that interface element sizes and positions can easily be adjusted according to the content to be displayed. Furthermore, a complete interface constructed according to an embodiment can be resized, and each sub-element will be adjusted proportionately, or according to another policy specified by the user.

Figure 1:
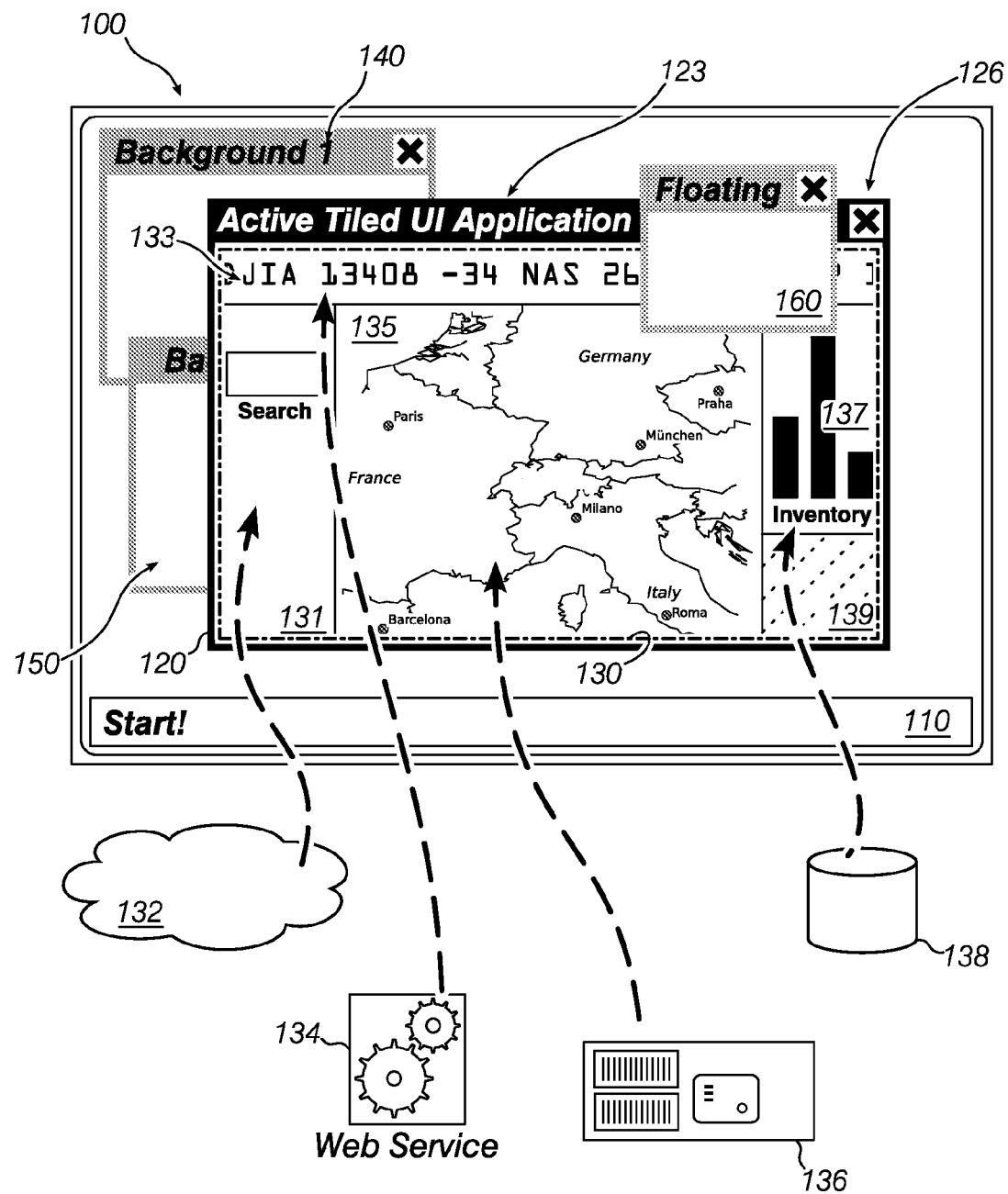
FIG. 1 shows an example application user interface prepared according to an embodiment of the invention.

FIG. 1 shows a sample user interface created according to methods of an embodiment of the invention. The largest rectangle 100 indicates the boundaries of the display screen. Area 110 contains information and control buttons for interacting with an operating system ("OS") of the computer; this area is commonly called a "task bar." Shaded area 120, including title 123 and window control button 126, form a boundary around a rectangular area 130 (indicated by a dot/dash line). Within rectangular area 130, sample user interface elements configured as described here are shown. Area 120 is often referred to as a "window frame." Outside of window frame 120, portions of other windows 140, 150 are visible (windows 140 and 150 are stacked "below" window frame 120). Window 160 is stacked "above" window frame 120, and therefore occludes part of window frame 120 and rectangular area 130.

Rectangular area 130 is subdivided into a number of smaller, non-overlapping tiles 131, 133, 135, 137, 139. Boundary lines dividing the tiles need not be parallel to one of the sides of rectangular area 130, but many calculations and operations of an embodiment are simplified if the boundaries are parallel. Also, individual tiles need not be rectangular, although some embodiments will impose that limitation for ease of implementation or use.

Each tile may be assigned a content source, which provides text, graphical information or the like to be displayed within the boundaries of the tile. Content sources may be static or dynamic. In this Figure, tile 131 presents a user-entry form for retrieving content from a distributed data network 132 such as the Internet. Tile 133 displays content from a web service 134. Tile 135 displays a shipment tracking map from logistics system 136. Tile 137 shows inventory data from database 138. If a tile has no assigned content source (e.g. tile 139) it may be filled with a solid foreground or background color, an image or pattern, or another visual indicator that there is no content currently being displayed.

A variety of different content sources may be available for assignment to a tile. Simple content sources may fill their assigned tile with a single color; this may be useful to prevent visual crowding between adjacent tiles or to draw the user's attention to a nearby tile. A content source may display static (unchanging) text or graphics in a tile. Numeric information from a database may be presented in a table or as a graph (e.g. a bar chart, pie chart or scatter plot); this information may be updated dynamically if the database contents change. A content source may display traditional computer user interface elements such as buttons or menus within a tile.

In a preferred embodiment, an Internet browser content source is available for assignment to a tile. (Tile 131 in FIG. 1 shows a simplified version of such a browser.) The browser may display a Uniform Resource Locator ("URL") entry field, a set of bookmarks, various browser control buttons, and may render information encoded according to the Hypertext Markup Language ("HTML"). In some embodiments that permit assignment of an Internet browser to a tile, certain portions of the browser may be disabled. For example, a "Back" button may be made inoperative, or bookmarks and URL entries may be restricted so that the browser can only retrieve and display a limited set of Internet resources. The enabled functions of a browser content source may correspond to the identity of a user for whom the active tiled user interface has been prepared. Disabling standard browser features and controls, such as the "Back" button or the "Reload" button, may help ensure system integrity if the browser is used to perform part of a transaction sequence. For example, in a goods ordering process, multiple orders might be placed inadvertently if a user was able to go "Back" or "Reload" an order confirmation page.

FIG. 2 illustrates a method used by an embodiment of the invention to configure an active tiled user interface. A rectangular area of an interface screen is selected (210) and divided into a plurality of rectangular sub-areas (220). In the most general case, the division is into m×n sub-areas, where m and n are positive integers. Next, a content source is assigned to one of the sub-areas (230). Material from the content source is displayed (240). If there are more sub-areas (250), more content sources may be assigned. The foregoing operations may be repeated, in combination with other configurations and adjustments discussed below, until the appearance of the user interface is satisfactory. Then, an explicit "save" operation (260) may be invoked so that the same interface configuration can be restored at another time. Alternatively, a system may automatically record the user interface configuration after each change (noting information such as the divisions of screen areas into sub-areas and the assignment of content sources to the sub-areas) so that the last configuration seen by the user can be recreated when the user begins to work with the application again.

Figure 3A:
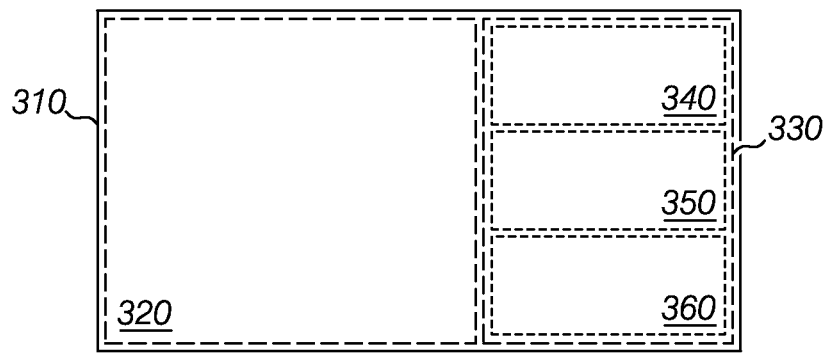
FIGS. 3A and 3B show how a user interface created according to an embodiment of the invention can be viewed as a hierarchical data structure describing a nested grid of user interface tiles.
Figure 3B:
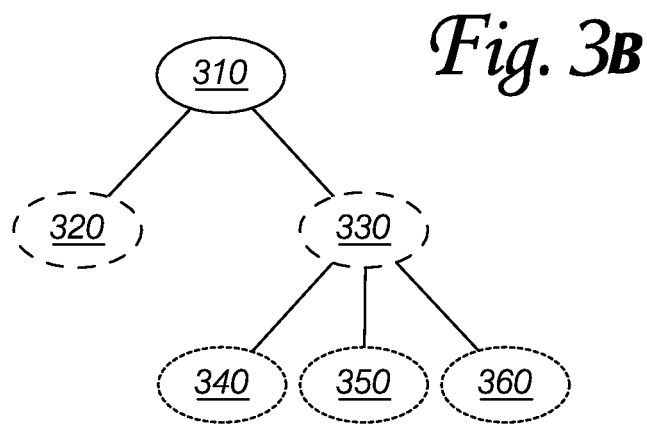

Note that the rectangular sub-areas into which a rectangular area is divided can be further sub-divided into smaller areas. Sub-areas can be thought of as "children" of the encompassing "parent" area (and "siblings" of each other). Thus, an active tiled user interface can be viewed as a hierarchy of rectangular areas and sub-areas, where the leaf nodes of the hierarchy identify content sources that are assigned to the sub-area. FIG. 3A shows a rectangular area 310 that is subdivided into two side-by-side tiles 320 and 330 (long-dashed boundaries). Tile 330 is further subdivided into three vertically-disposed tiles 340, 350 and 360 (short-dashed boundaries). FIG. 3B shows the corresponding hierarchy: root node 310 represents the top-most rectangular area, and lower-level nodes represent the correspondingly-numbered sub-areas. The user interface can be thought of as a nested grid of sibling tiles, where all of the children of a parent (and siblings of each other) cover substantially all of the area of the parent. No sibling overlaps any other sibling, and each sibling shares at least one common boundary with another sibling. In FIG. 3A and many following figures, sub-areas are shown by inset boxes, but this representation is only intended to show clearly how sub-areas are related (e.g. as siblings and children of a common parent). An embodiment may locate a sub-area exactly at the boundary of its parent, and may place two sibling sub-areas in contact with each other, without any space between them.

The method outlined in FIG. 2 can be applied repeatedly (recursively) to create a tiled user interface of arbitrary complexity. The very first area to be selected and sub-divided may be the entire area of a display screen, or the content ("inside") area of a window that is managed by an ordinary overlapping window manager. FIG. 4 outlines a second method that is available during the configuration of an active tiled user interface, to "undo" the sub-division of a rectangular area into a plurality of sub-areas. Two or more adjacent rectangular sub-areas of an interface screen are selected (410) and replaced with a single larger rectangular area (420). The larger area is substantially equal in size to the union of the selected, adjacent sub-areas. If only one of the selected sub-areas had a content source assigned (430), then that content source is assigned to the single larger area (440). Otherwise, one of the content sources assigned to the selected sub-areas is chosen (450) and assigned to the single larger area (460); the other content sources are discarded (470).

The procedure described with reference to FIG. 4 alters the subdivision hierarchy of the active tiled user interface by replacing a plurality of sibling leaf nodes with a single leaf node, or in some configurations by removing all of the children of a parent node, turning the parent node itself into a leaf node. Some embodiments may restrict the tiles selected for coalescing to sibling nodes (children of the same parent) while other embodiments may automatically reconfigure the user interface hierarchy to permit adjacent tiles that are part of separate hierarchies to be combined.

Figure 5A:
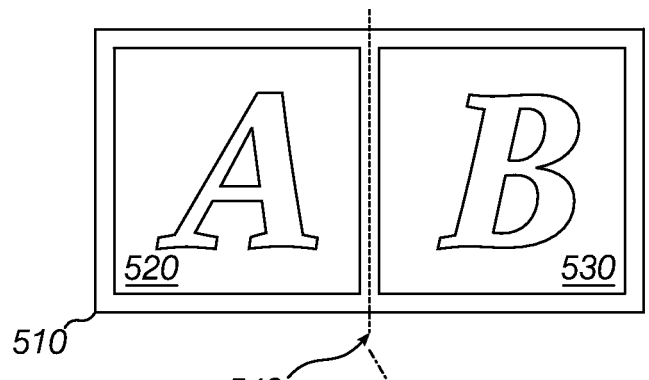
FIGS. 5A, 5B and 5C show how the sizes of sub-areas in a user interface configured according to an embodiment of the invention can be altered.
Figure 5B:
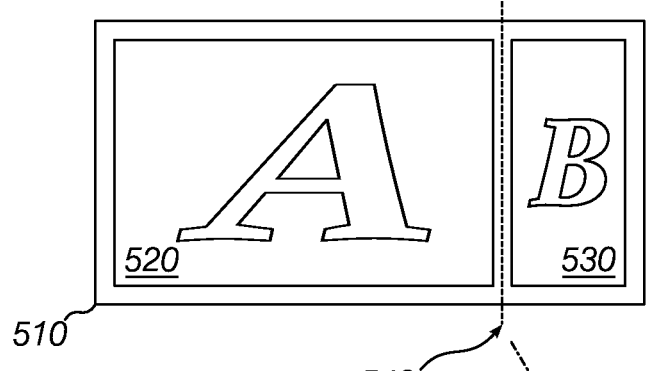
Figure 5C:
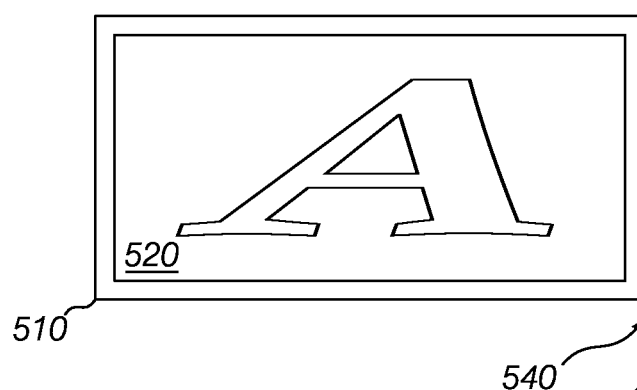

In addition to configuring an active tiled user interface by subdividing areas and coalescing adjacent areas, embodiments permit the user to adjust the sizes of tiles to suit their contents. FIG. 5A shows a rectangular area 510 subdivided into two areas 520 and 530. The large, outline letters "A" and "B" represent content sources assigned to each of the areas. By default, dividing an area into n sub-areas may produce n equal-sized areas, as shown here. (In this case, n is 2.) The user may subsequently resize two or more areas by adjusting the dividing line between the areas 540. FIG. 5B shows the same subdivided rectangular area 510, but area 520 has been expanded (and area 530 correspondingly reduced) by moving dividing line 540 to the right. As a convenience to the user, some embodiments may permit two adjacent areas to be coalesced, and the content source to be assigned to the larger area, simply by moving the dividing line between the two areas all the way across the sub-area to be removed. This is shown in FIG. 5C: dividing line 540 has been moved all the way to the right edge of what was area 530, with the result that area 520 and its content occupy all of rectangular area 510. (Some embodiments may reconfigure the hierarchical tile structure when all but one child of a parent area is removed—the parent itself can be converted to a leaf node, displaying the content source that had been assigned to the last child.)

Figure 6A:
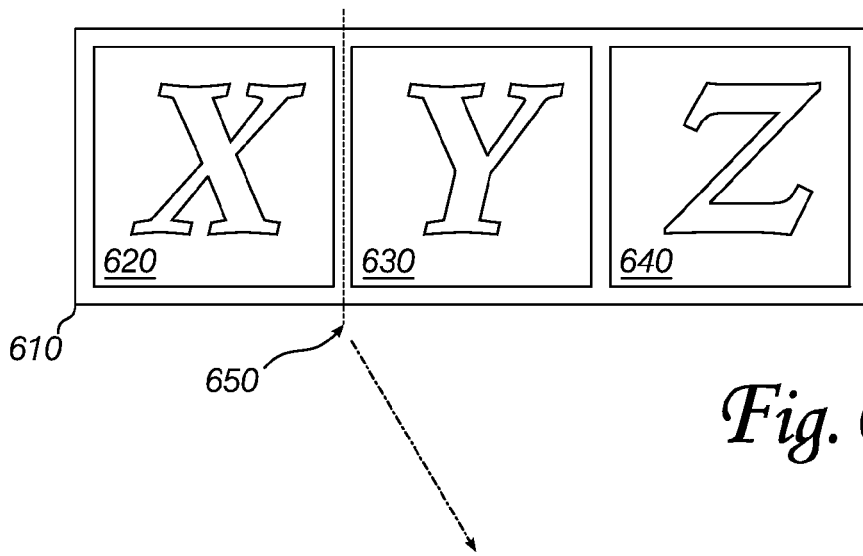
FIGS. 6A, 6B, 6C and 6D show two different ways of adjusting the sizes of a plurality of sub-areas that are affected by a change in another sub-area.
Figure 6B:
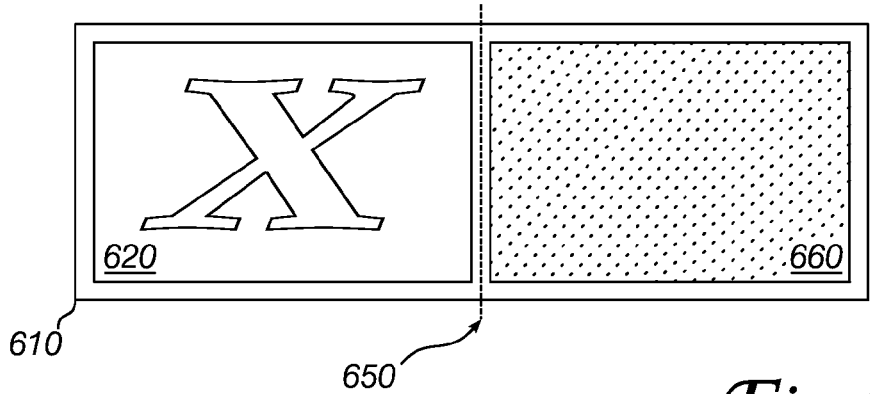
Figure 6C:
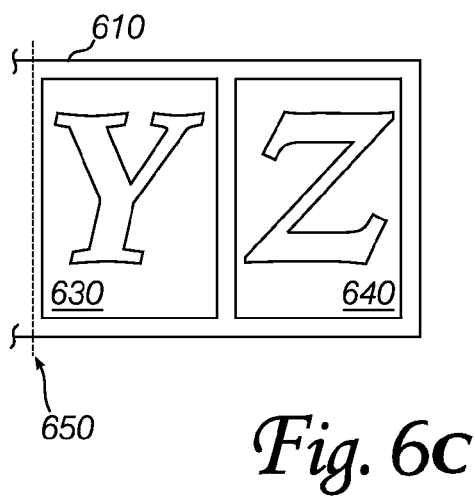
Figure 6D:
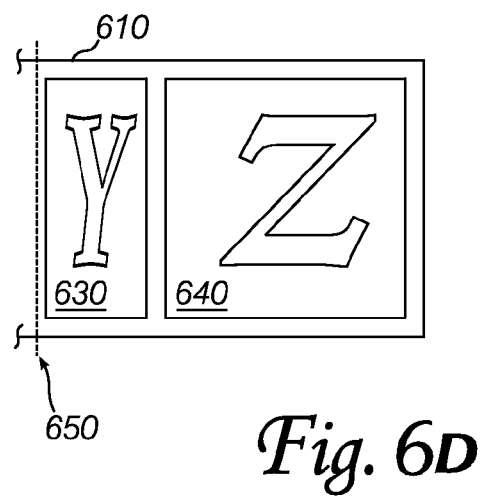

FIG. 6A shows a similar scenario with three sub-areas 620, 630 and 640 defined within a parent area 610. Again, each sub-area contains an outlined character to represent a content source assigned to the sub-area. Dividing line 650, between sub-areas 620 and 630, is moved to the right. FIG. 6B shows that sub-area 620 has increased in size, but an embodiment has several options when adjusting the other sub-areas, which now must be resized to fit in area 660. One option, depicted in FIG. 6C, is to divide area 660 evenly between the tiles that must be placed there: sub-areas 630 and 640 are equally sized. (More generally, the ratio of their widths may be held constant.) Another option, depicted in FIG. 6D, is to "deduct" all of the expansion of area 620 from one of the other tiles (in this example, sub-area 630 has been diminished in direct proportion to the increase in the size of area 620, while area 640 has remained unchanged).

Figure 7A:
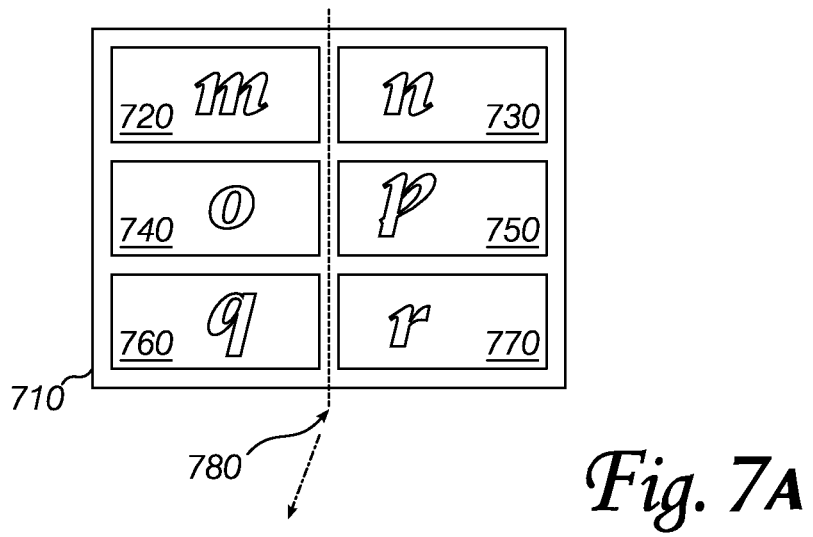
FIGS. 7A, 7B and 7C show two ways that a two-dimensional array of sub-areas can be adjusted.
Figure 7B:
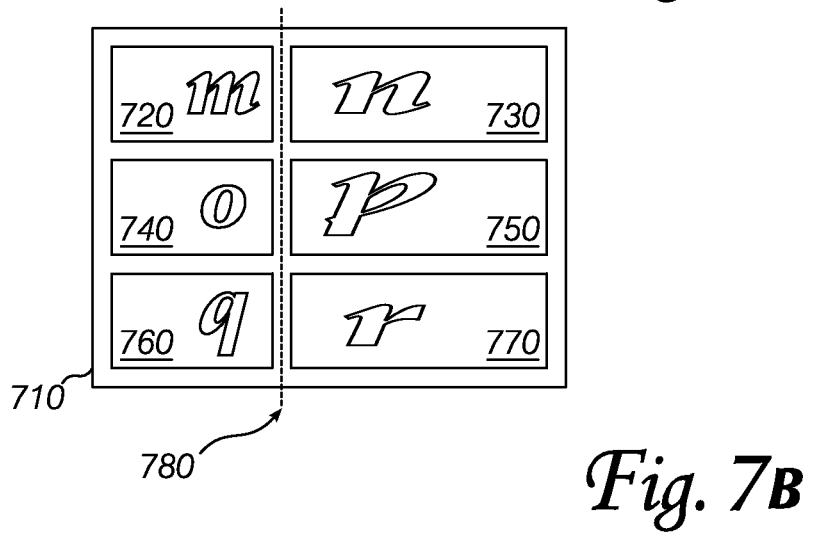
Figure 7C:
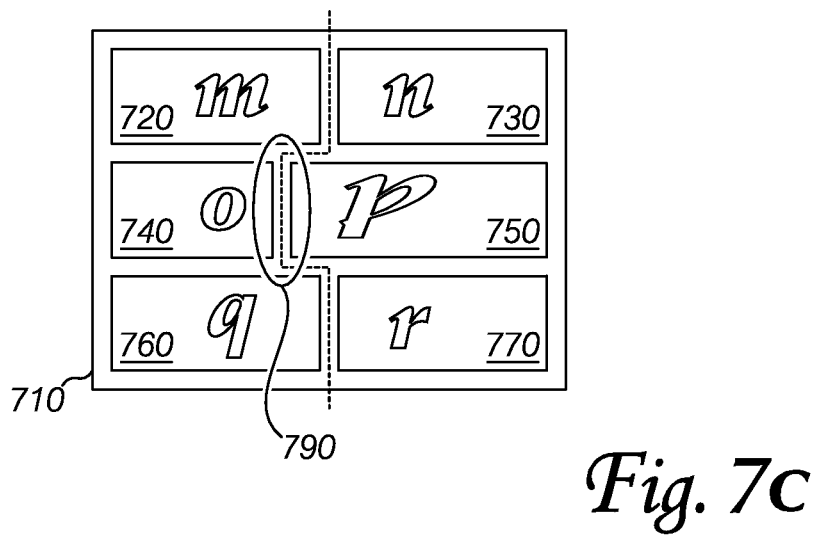

FIG. 7A shows a rectangular area 710 that has been subdivided into a 3×2 (row-by-column) array of sub-areas 720-770. In FIG. 7B, dividing line 780 separating the two columns of sub-areas has been moved to the right, decreasing the sizes of sub-areas 720, 740 and 760, while simultaneously increasing the sizes of areas 730, 750 and 770. In some embodiments, individual rows or columns of a multi-row, multi-column array of sub-areas can be adjusted independently. An example of this latter approach is shown in FIG. 7C: the dividing line 780 is adjusted only as between sub-areas 740 and 750, resulting in the "jog" circled at 790. An embodiment may automatically reconfigure the hierarchical subdivision structure to facilitate the independent adjustment of portions of a multi-row, multi-column array. For example, the 3×2 array of FIG. 7A may be converted to three, 1×2 arrays containing, respectively, sub-areas 720 and 730; 740 and 750; and 760 and 770. Then, the division between 740 and 750 can be adjusted independently of the other 1×2 arrays, as shown in FIG. 7C.

Figure 8A:
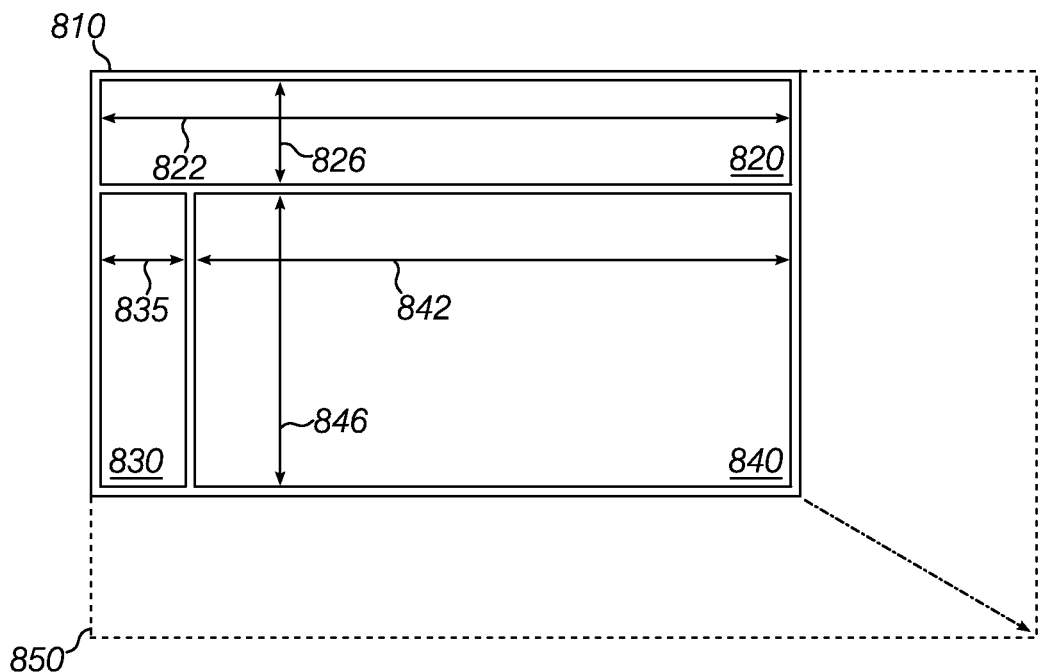
FIGS. 8A and 8B show how resizing a parent area can affect the children of the parent.

FIG. 8A illustrates another example of resizing a subdivided rectangular area as an embodiment of the invention operates. Element 810 is a rectangular area that is subdivided into three smaller areas, 820, 830 and 840. The area available to element 810 (and its children) is to be increased as shown in phantom at 850. Horizontal and vertical measurements of the three sub-areas are shown at 822 and 826; 835; and 842 and 846. An embodiment of the invention may adjust sub-area sizes according to a number of different strategies, some of which are illustrated in FIG. 8B.

Figure 8B:
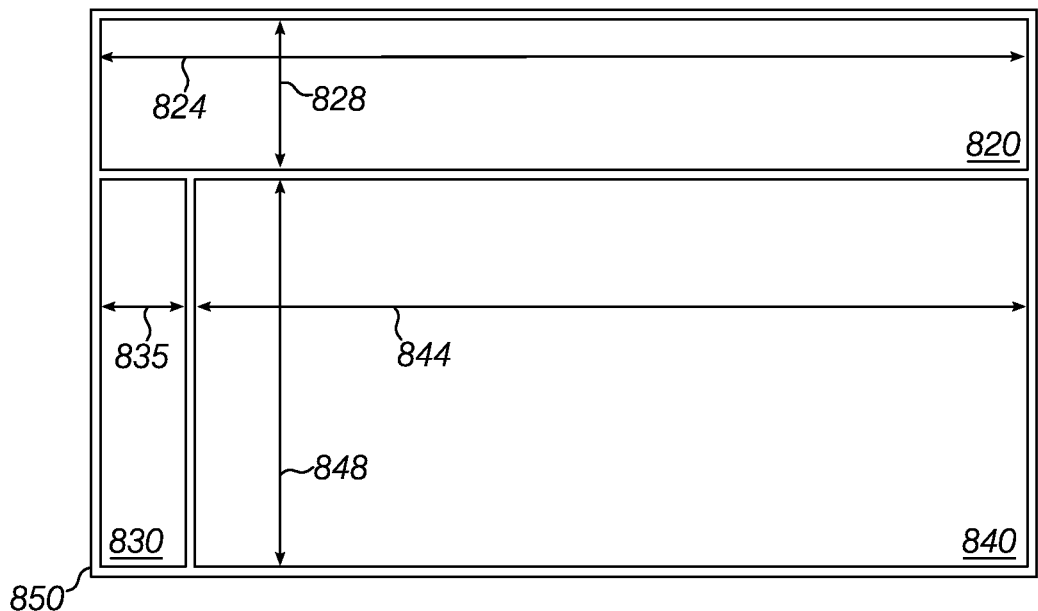

In FIG. 8B, note that the parent area has been expanded to the boundary indicated at 850. The width of sub-area 820 has increased from 822 to 824, the full extent of the horizontal increase in size between 810 and 850. Area 830 has not increased in width at all; its width is fixed or "locked" at 835. Consequently, area 840, adjacent to area 830, has increased in width from 842 to 844—the absolute value of the increased width of area 840 is the same as the absolute value of the increased width of area 820, although the proportional increases are different.

In the vertical direction, areas 820 and 840 have been increased proportionally to their original sizes. That is, the ratio of dimension 826 to dimension 846 in FIG. 8A is identical to the ratio between dimension 828 and dimension 848 in FIG. 8B.

Embodiments of the invention may permit a user to specify policies for adjusting the sizes of sub-areas when the area containing the sub-areas is resized. As discussed with relation to FIGS. 8A and 8B, a sub-area's horizontal or vertical dimension may be fixed, or may be adjusted in proportion to the dimensions of other sub-areas in the area. Minimum and maximum dimensions may be specified, so that a sub-area is never reduced below the minimum, nor expanded beyond the maximum. It is appreciated that non-rectangular areas may require more complex resizing policy specifications, but resizing can still be performed automatically.

Note that in an embodiment of the invention, live data continues to be displayed in each sub-area from the content source assigned to the sub-area even after the size of the sub-area is altered by the user (or automatically in response to the resizing of another area). Furthermore, a different content source may be assigned to a sub-area at any time, and after such (re-) assignment, data from the new content source will appear in the sub-area. Since reconfiguration of a user interface may be done by the user himself as he uses an application, content sources that vary their display based on information such as the time of day or the identity of the user will present their data in true what-you-see-is-what-you-get ("WYSIWYG") form. Thus, for example, a user who is permitted to see detailed information from a database may increase the size of a sub-area where the information is displayed, while a user who may only see a summary of the information can decrease the size of the sub-area to preserve display space for other content sources.

FIG. 9 shows some components and subsystems of a computer system that supports an embodiment of the invention. One or more programmable processors (shown as Central Processing Units or "CPUs") 910 perform operations according to instructions and data stored in memory 920 to implement the methods described above. Instructions and data in memory 920 may be partitioned into logical subsets such as operating system 922 (to control various system hardware resources and allocate the resources between processes); window manager 925 (to coordinate display operations of several applications and implement stacked or overlapping windows); and application 928 (to interact with the user and perform such tasks as the user may direct). Application 928 may include data and instructions to implement the active tiled user interface configuration and adjustment procedures described above.

A network interface card ("NIC") 930 permits the system to communicate via a local area network ("LAN", not shown), while a video display adapter 940 prepares signals for output on a display screen 950. Mass storage interface 960 permits the system to store and retrieve data on a mass storage device 970 such as a hard disk drive. System bus 980 carries control signals and data between the various components.

In the foregoing material, certain operations of embodiments have been described by active verbs: "selecting" (an area), "dividing," and "assigning." However, an embodiment of the invention is commonly implemented as software and/or hardware logic to permit a user to perform the described operations. Thus, operations of an embodiment of the invention might more precisely be described as "receiving an indication from a user that the user wishes to select an area" or "accepting a designation from a user of a content source that the user desires to assign to a sub-area." Clearly, these "more precise" descriptions are cumbersome out of all proportion to their benefits in particularly pointing out and distinctly claiming material considered to be the invention. Therefore, the more direct, active words will be employed below.

An embodiment of the invention may be a machine-readable medium having stored thereon instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that an active tiled user interface can also be constructed and managed by software and hardware that distribute the functions of embodiments of this invention differently than herein described. Such variations and implementations are understood to be captured according to the following claims.

We claim:

1. A system comprising;
a display screen to present information from a plurality of sources;
a window manager to coordinate display of a plurality of overlapping windows on the display screen;
logic including functionality to:
reconfigure a content area of one of the plurality of overlapping windows into a nested grid comprising non-overlapping parent tiles, at least one of the non-overlapping parent tiles comprising a plurality of non-overlapping child tiles, and
evenly adjust, according to a first option defined by a user in a user specified policy, a first of the plurality of non-overlapping child tiles and a second of the plurality of non-overlapping child tiles, the evenly adjusting being responsive to detecting selection and movement of a dividing line adjacent to the first of the plurality of non-overlapping child tiles and non-adjacent to the second of the plurality of non-overlapping child tiles, wherein the first option specifies even adjustment of the plurality of non-overlapping child tiles responsive to detection of selection and movement of the dividing line;
adjust, according to a second option defined by a user in the user specified policy, the first of the plurality of non-overlapping child tiles responsive to detecting the selection and movement of the dividing line, wherein the second option specifies adjusting the first of the plurality of non-overlapping child tiles and not adjusting the second of the plurality of non-overlapping child tiles;
and
a first content source supplying information for display in at least one of the first of the plurality of non-overlapping child tiles or the second of the plurality of non-overlapping child tiles.

2. The system of claim 1 wherein the logic includes functionality to change supplying of information for display in the at least one of the first of the plurality of non-overlapping child tiles or the second of the plurality of non-overlapping child tiles to a second content source.

3. The system of claim 1 wherein the first content source is an Internet browser.

4. The system of claim 3 wherein a "Back" button of the Internet browser is inactive.

5. The system of claim 3 wherein a Uniform Resource Locator ("URL") entry field is inactive.

6. The system of claim 1 wherein first content source is a database.

7. A method for providing a user interface, the method comprising:
displaying a window as a nested grid comprising non-overlapping parent tiles, at least one of the non-overlapping parent tiles comprising a plurality of non-overlapping child tiles;
detecting movement of a dividing line adjacent to a first of the plurality of non-overlapping child tiles, wherein the dividing line is non-adjacent to a second of the plurality of non-overlapping child tiles;
accessing a user-specified policy for resizing the first of the plurality of non-overlapping child tiles and the second of the plurality of non-overlapping child tiles, wherein the user-specified policy includes one of:
a first option to evenly resize the first of the plurality of non-overlapping child tiles and the second of the plurality of non-overlapping child tiles, and
a second option to resize the first of the plurality of non-overlapping child tiles and not resize the second of the plurality of non-overlapping child tiles;
adjusting, responsive to detecting the movement of the dividing line, a first size for the first of the plurality of non-overlapping child tiles and a second size for the second of the plurality of non-overlapping child tiles when the accessed user-specified policy includes the first option; and,
adjusting, responsive to detecting the movement of the dividing line, the first size for the first of the plurality of non-overlapping child tiles while maintaining the second size for the second of the plurality of non-overlapping child tiles when the accessed user-specified policy includes the second option.

8. The method of claim 7 further comprising receiving an assignment of a content source for the first of the plurality of non-overlapping child tiles or the second of the plurality of non-overlapping child tiles.

9. The method of claim 8 further comprising displaying information from the content source in the first of the plurality of non-overlapping child tiles or the second of the plurality of non-overlapping child tiles.

10. The method of claim 8 wherein the content source includes an Internet browser.

11. The method of claim 8 wherein the content source includes a web service.

12. The method of claim 8 wherein the content source includes a database.

13. The method of claim 7 further comprising saving an interface configuration of the nested grid.

14. The method of claim 7 wherein displaying the window as a nested grid is based on a saved interface configuration.

15. A system for providing a tiled user interface, the system comprising:
a processor;
a memory storing instructions that when executed by the processor cause the processor to perform operations including:
displaying a nested grid comprising a plurality of non-overlapping tiles;

detecting movement of a dividing line adjacent to a first of the plurality of non-overlapping tiles, wherein the dividing line is non-adjacent to a second of the plurality of non-overlapping tiles;

accessing a user-specified policy for resizing the first of the plurality of non-overlapping tiles and the second of the plurality of non-overlapping tiles, wherein the user-specified policy includes one of:

a first option to evenly resize the first of the plurality of non-overlapping tiles and the second of the plurality of non-overlapping tiles, and a second option to resize the first of the plurality of non-overlapping tiles and not resize the second of the plurality of non-overlapping tiles;

adjusting, responsive to detecting movement of the dividing line, the first of the plurality of non-overlapping tiles and the second of the plurality of non-overlapping tiles when the accessed user-specified policy includes the first option; and, adjusting, responsive to detecting the movement of the dividing line, the first of the plurality of non-overlapping tiles while not adjusting the second of the plurality of non-overlapping tiles when the accessed user-specified policy includes the second option.

16. The system of claim 15 wherein the operations further include receiving an assignment of a content source for the first of the plurality of non-overlapping tiles or the second of the plurality of non-overlapping tiles.

17. The system of claim 16 wherein the operations further include displaying information from the content source in the first of the plurality of non-overlapping tiles or the second of the plurality of non-overlapping tiles.

18. The system of claim 16 wherein the content source includes a web service.

19. The system of claim 16 wherein the content source includes a database.

20. The system of claim 15 wherein the operations further include saving an interface configuration of the nested grid for restoring the nested grid during a subsequent display.

* * * * *